Figure 1:
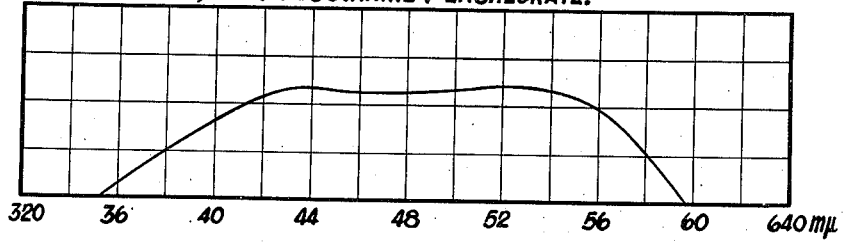

Feb. 11, 1941.  L. G. S. BROOKER  2,231,657
PROCESS OF PREPARING 4, 4'-PYRIDOCYANINE DYES
Filed March 6, 1937

Leslie G. S. Brooker,
INVENTOR:
BY
ATTORNEYS.

Patented Feb. 11, 1941

2,231,657

UNITED STATES PATENT OFFICE 2,231,657

PROCESS OF PREPARING 4,4'-PYRIDOCY-ANINE DYES

Leslie G. S. Brooker, Rochester, N. Y., assignor to Eastman Kodak Company, Rochester, N. Y., a corporation of New Jersey Application March 6, 1937, Serial No. 129,434

8 Claims. (Cl. 260—240)

This invention relates to a new kind of cyanine dye, namely the 4,4'-pyridocyanines, and to photographic emulsions containing the same.

Certain cyanine dyes are known to alter the sensitivity of photographic emulsions, but not all known cyanine dyes will do so, and some known cyanine dyes have a weak, impractical action. Now, I have found an entirely new group of cyanine dyes which can be referred to as the 4,4'-pyridocyanines. I have further found that these new dyes alter the sensitivity of photographic silver salt emulsions, particularly photographic silver halide emulsions, in a new and useful manner.

An object of my invention, therefore, is to provide 4,4'-pyridocyanine dyes. A further object is to provide a process for the preparation of such dyes. A still further object is to provide photographic emulsions containing such dyes. Other more specific objects will become apparent upon a complete perusal of this specification.

My new dyes consist of two pyridine nuclei linked through their respective 4-positions by a methenyl group, while attached to each of the nitrogen atoms of the pyridine nuclei are suitable organic groups and attached to one or the other of the nitrogen atoms is a suitable acid radical.

The following general formula serves to illustrate my new dyes:

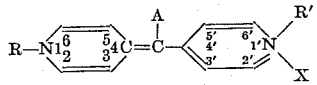

where A represents hydrogen or alkyl, R and R' represent alkyl groups and X represents an acid radical. The pyridine nuclei can carry simple substituents, such as methyl, methoxy, amino or the like. More specifically A can represent methyl, ethyl or the like, R and R' can represent methyl, allyl, ethyl, n-butyl, decyl or the like and X can represent an acid radical such as halide, p-toluenesulfonate, alkylsulfate, perchlorate or the like.

My new dyes are advantageously prepared, I have found, by reacting a 4-halogeno-, 4-alkylmercapto- or 4-arylmercapto-pyridine quaternary salt with a pyridine quaternary salt containing a reactive alkyl group in the 4-position in the presence of a basic condensing agent. The following illustrates my new process:

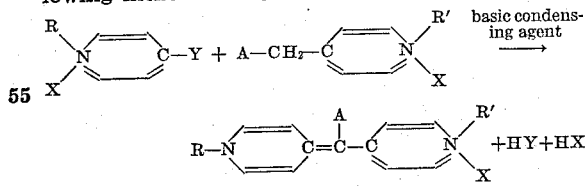

wherein A, R, R' and X have the values pointed out above and Y can represent halogen or alkylmercapto, such as methylmercapto, n-butylmercapto or benzylmercapto or arylmercapto, such as phenylmercapto. I have found it particularly advantageous to employ the arylmercapto, such as phenylmercapto, derivatives. The basic condensing agent can be alkali, such as sodium hydroxide, alkali carbonates, such as sodium or potassium carbonates, sodium ethylate or organic bases particularly strong tertiary organic bases, such as triethylamine, N-methylpiperidene, triethanolamine or the like. The condensing agent acts to bind the elements of acid eliminated from the condensing molecules. A slight excess of condensing agent is advantageously employed. A diluent in the reaction mixture is advantageously employed. The diluent is preferably so chosen that the formed dye will separate therefrom at least upon cooling. I have found lower aliphatic alcohols, i. e., those of four carbon atoms or less to be particularly well suited, especially n-propyl. Heat accelerates the formation of our new dyes.

The following examples serve to illustrate the preparation of my new dyes. These examples are not intended to limit my invention.

EXAMPLE 1.—*1,1'-dimethyl-4,4'-pyridocyanine perchlorate*

6.9 g. (1 mol.) of γ-picoline metho-p-toluenesulfonate, 6.4 g. (1 mol.) of 4-chloropyridine methiodide, 15 cc. of n-propyl alcohol and 5.8 g. (2.2 mols.) of triethylamine were heated at 100° C. under reflux for about 30 minutes. The dye was precipitated by the addition of diethyl ether to the reaction mixture. The precipitate was dissolved in hot water (10 cc.) and treated with 3.5 g. of sodium perchlorate in concentrated aqueous solution. The dye separated from the cooled perchlorate reaction mixture and after twice recrystallizing from methyl alcohol was obtained as reddish-brown needles having a green reflux and melting at 263–265° C. with decomposition.

The 4-chloropyridine methiodide used in the above example was prepared by separately chilling to 0° C. 16 g. (1 mol.) of 4-chloropyridine and 67 g. (4 mols.) of methyl iodide. The chilled substances were then mixed and allowed to stand at 0° C. in the dark for four days. The methiodide separated as a yellow solid melting at 152–155° C. with decomposition. The salt is sufficiently pure to be used in the above example, but can be recrystallized from acetone if desired.

EXAMPLE 2.—*1,1' dimethyl-4,4'-pyridocyanine perchlorate*

5.6 g. (1 mol.) of γ-picoline metho-p-toluenesulfonate, 6.6 g. (1 mol.) of 4-phenylmercaptopyridine methiodide, 30 cc. of n-propyl alcohol and 6.3 g. (3.3 mols.) of triethylamine were refluxed together for about 90 minutes. The dye, as the iodide, separated from the cooled reaction mixture. This iodide was dissolved in a minimum quantity of hot methyl alcohol and converted into the perchlorate as in Example 1. After two recrystallizations from methyl alcohol, the perchlorate was obtained as reddish-brown needles having a greenish reflex and melting at 263–265° C. with decomposition. The yield was lower than that obtained in Example 1.

The 4-phenylmercaptopyridine methiodide employed in the above example was prepared from 4-chloropyridine as follows: 15.5 g. (1 mol.) of 4-chloropyridine were added to 22 g. (1 mol.) of phenylmercaptan cooled in a freezing mixture. A vigorous reaction ensued and the reaction mixture set to a solid mass which was then heated at 100° C. for about 10 minutes. The solid so obtained was the hydrochloride of 4-phenylmercaptopyridine. It was washed with ether and the free base generated with ammonia. The base was extracted from the ammonia reaction mixture with diethyl ether and purified by distillation. Boiling point 128–129° C. at 2 mm. 3.4 g. (1 mol.) of the pure base and 6.6 g. (2 mol.) of methyl iodide were gently refluxed for about 30 minutes (initial reaction was vigorous). The methiodide separated from the cooled reaction mixture and was washed with diethyl ether and dried in vacuo. The methiodide was thus obtained as colorless crystals melting at 174–176° C. with decomposition. 4-iodopyridine can be used instead of 4-chloropyridine to produce 4-phenylmercaptopyridine. In a manner similar to that illustrated above, 4-n-butylmercaptopyridine and its alkyl quaternary salts can be prepared.

EXAMPLE 3.—*1,1'-diethyl-4,4'-pyridocyanine perchlorate*

17.6 g. (3 mol.) of γ-picoline etho-p-toluenesulfonate, 8 g. (1 mol.) of 4-phenylmercaptopyridine ethiodide, 15 cc. of n-propyl alcohol and 4.2 g. (2.2 mol.) of triethylamine were refluxed for about 90 minutes. The dye was precipitated from the reaction mixture by adding diethyl ether. The precipitate was treated with 2.5 g. of sodium perchlorate dissolved in 3 cc. of water. The dye, as the perchlorate, separated from the perchlorate reaction mixture after concentrating carefully. The dye was washed with ether and acetone to remove some colorless material and was finally twice recrystallized from a 50–50 (volume) mixture of acetone and water. The perchlorate dye was obtained as beautiful brown-orange needles having a bright greenish-golden reflex and melting at 196–198° C. with decomposition. Employing the metho-p-toluenesulfonate instead of the etho, the 1-ethyl-1'-methyl dye is obtained.

The 4-phenylmercaptopyridine ethiodide used in the above example was prepared by heating one molecular proportion of 4-phenylmercaptopyridine with one molceular proportion of ethyl iodide in a sealed tube at 100° C. for about 17 hours. The solid obtained was washed with diethyl ether and recrystallized from acetone. The solid was 4-phenylmercaptopyridine ethiodide melting at 178–180° C. with decomposition.

In the above examples, 4-n-butylmercaptopyridine or other alkylmercapto derivatives or β-naphthylmercapto derivatives can be employed instead of 4-phenylmercapto derivatives. The γ-picoline quaternary salts can be replaced by 4-ethylpyridine quaternary salts or the like.

These new 4,4'-pyridocyanine dyes show a novel sensitizing action in photographic emulsions, particularly silver chloride and silver bromide emulsions. Accordingly, my invention is particularly directed to the customarily employed silver halide emulsions. My invention is further particularly directed to the customarily employed gelatin emulsions, gelatin being the carrier or medium in which the light-sensitive material is suspended. However, any other suitable carrier can be used.

Figure 2:
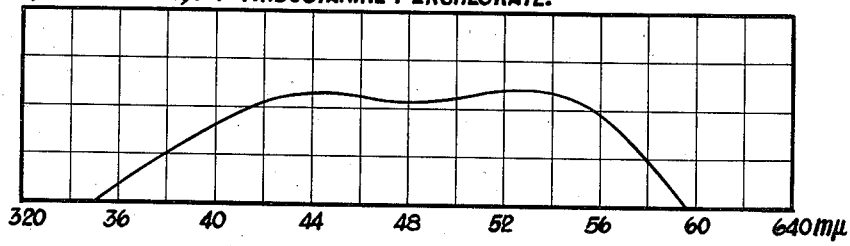

The sensitizing effect of my new dyes will be illustrated with reference to gelatino-silver-bromide emulsions, since it is in these particular emulsions that my new dyes are most useful. The illustrations will be made with reference to the dye-perchlorates. Fig. 1 of the accompanying drawing illustrates diagrammatically the sensitivity of an ordinary silver bromide emulsion containing 1,1'-dimethyl-4,4'-pyridocyanine perchlorate. Fig. 2 illustrates diagrammatically the sensitivity of an ordinary silver bromide emulsion containing 1,1'-diethyl-4,4'-pyridocyanine perchlorate. Ordinary silver bromide emulsions containing other 4,4'-pyridocyanines have a similar sensitivity. In an ordinary gelatino-silver-chloride emulsion, 1,1'-dimethyl-4,4'-pyridocyanine perchlorate produces a sensitivity extending to about 570 millimicrons. Maximum sensitivity is at about 520 millimicrons. Similarly, in an ordinary silver chloride emulsion, 1,1'-diethyl-4,4'-pyridocyanine perchlorate produces sensitivity extending to about 565 millimicrons, with maximum sensitivity at about 525 millimicrons. From these illustrations it is clear that my new dyes sensitize silver halide emulsions in a novel and useful manner to light of the blue-green and green regions of the spectrum.

In the preparation of photographic emulsions containing my new dyes, it is only necessary to disperse uniformly from about 5 to about 100 milligrams of the dye or a mixture of the dyes in about 1000 cc. of the flowable emulsion, the concentration of dye being varied according to the type of light-sensitive material which goes to make up the emulsion and according to the effects desired. The suitable and most economical concentration for any given emulsion will be apparent to those skilled in the art, upon making the ordinary tests and observations customarily used in the art of emulsion making.

To prepare a gelatino-silver-halide emulsion, the following procedure is satisfactory. A quantity of the dye is dissolved in methyl alcohol or other suitable solvent, and a volume of this solution (which may be diluted with water) containing from 5 to 100 milligrams of the dye is slowly added to about 1000 cc. of a gelatino-silver-halide emulsion, with stirring. Stirring is continued until the dye is uniformly dispersed. 10 to 20 milligrams of dye per 1000 cc. of emulsion ordinarily suffices to produce the maximum sensitizing effects in the ordinary gelatino-silver-halide emulsions.

The above statements are only illustrative and not to be understood as limiting my invention in any sense, as it will be apparent that these dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to set or dry.

My new dyes are useful in the preparation of light filters.

What I claim as my invention and desire to be secured by Letters Patent of the United States is:

1. A process for preparing a 4,4'-pyridocyanine dye comprising reacting, in the presence of a basic condensing agent, a 4-reactive alkyl pyridine alkyl quaternary salt with a pyridine alkyl quaternary salt containing in the 4-position, a reactive group selected from the group consisting of aryl mercapto groups of the benzene series and aryl mercapto groups of the naphthalene series.

2. A process for preparing a 4,4'-pyridocyanine dye comprising reacting, in the presence of a strong organic basic condensing agent, a 4-reactive alkyl pyridine quaternary salt with a pyridine quaternary salt containing in the 4-position, a reactive group selected from the group consisting of aryl mercapto groups of the benzene series and aryl mercapto groups of the naphthalene series.

3. A process for preparing a 4,4'-pyridocyanine dye comprising reacting, in the presence of a triethylamine condensing agent, a 4-reactive alkyl pyridine quaternary salt with a pyridine quaternary salt containing in the 4-position, a reactive group selected from the group consisting of aryl mercapto groups of the benzene series and aryl mercapto groups of the naphthalene series.

4. A process for preparing a 4,4'-pyridocyanine dye comprising reacting, in the presence of a basic condensing agent, a γ-picoline alkyl toluenesulfonate with pyridine alkiodide containing in the 4-position, a reactive group selected from the group consisting of aryl mercapto groups of the benzene series and aryl mercapto groups of the naphthalene series.

5. A process for preparing a 4,4'-pyridocyanine dye comprising reacting, in the presence of a strong organic basic condensing agent, a γ-picoline alkyl toluenesulfonate with pyridine alkiodide containing in the 4-position, a reactive group selected from the group consisting of aryl mercapto groups of the benzene series and aryl mercapto groups of the naphthalene series.

6. A process for preparing a 4,4'-pyridocyanine dye comprising reacting, in the presence of a triethylamine condensing agent, a γ-picoline alkyl toluenesulfonate with pyridine alkiodide containing in the 4-position, a reactive group selected from the group consisting of aryl mercapto groups of the benzene series and aryl mercapto groups of the naphthalene series.

7. A process for preparing a 4,4'-pyridocyanine dye comprising reacting, in the presence of a triethylamine condensing agent, γ-picoline alkyl etho-p-toluenesulfonate with pyridine ethiodide containing in the 4-position, a reactive group selected from the group consisting of aryl mercapto groups of the benzene series and aryl mercapto groups of the naphthalene series.

8. A process for preparing a 4,4'-pyridocyanine dye comprising reacting, in the presence of a basic condensing agent and an aliphatic alcohol of from 1-4 carbon atoms, a 4-reactive alkyl pyridine alkyl quaternary salt with a pyridine alkyl quaternary salt containing in the 4-position, a reactive group selected from the group consisting of aryl mercapto groups of the benzene series and aryl mercapto groups of the naphthalene series.

LESLIE G. S. BROOKER.